United States Patent
Bowden et al.

(10) Patent No.: US 8,498,757 B2
(45) Date of Patent: Jul. 30, 2013

(54) PORTABLE AND PERSONAL VEHICLE PRESETS

(75) Inventors: Upton Beall Bowden, Canton, MI (US); Theodore Charles Wingrove, Canton, MI (US); Anthony Ciatti, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 352 days.

(21) Appl. No.: 12/576,322

(22) Filed: Oct. 9, 2009

(65) Prior Publication Data

US 2011/0087385 A1    Apr. 14, 2011

(51) Int. Cl.
*G06F 7/00* (2006.01)

(52) U.S. Cl.
USPC .............. 701/2; 340/426.13; 340/426.14

(58) Field of Classification Search
USPC  701/36, 24, 200, 211, 33.4, 2, 33.3; 715/765;
340/5.61, 5.64, 426.36, 426.13, 426.14, 426.35,
340/5.25, 5.81, 5.22; 455/414.4; 341/175;
307/10.1; 700/18, 86
See application file for complete search history.

(56) References Cited

U.S. PATENT DOCUMENTS

| | | | |
|---|---|---|---|
| 5,633,484 A | 5/1997 | Zancho et al. | |
| 5,661,651 A | 8/1997 | Geschke et al. | |
| 5,796,176 A | 8/1998 | Kramer et al. | |
| 6,198,996 B1 | 3/2001 | Berstis | |
| 6,374,177 B1 * | 4/2002 | Lee et al. | 701/200 |
| 6,505,780 B1 | 1/2003 | Yassin et al. | |
| 6,622,083 B1 | 9/2003 | Knockeart et al. | |
| 6,625,503 B1 | 9/2003 | Smith | |
| 6,663,010 B2 | 12/2003 | Chene et al. | |
| 6,665,600 B2 | 12/2003 | Miller et al. | |
| 6,775,603 B2 | 8/2004 | Yester et al. | |
| 7,170,400 B2 | 1/2007 | Cowelchuk et al. | |
| 7,283,902 B2 | 10/2007 | Heider et al. | |
| 7,319,924 B2 | 1/2008 | Ampunan et al. | |
| 7,474,947 B2 | 1/2009 | Furui et al. | |
| 7,689,253 B2 * | 3/2010 | Basir | 455/563 |
| 2001/0049569 A1 | 12/2001 | Gehrke | |
| 2002/0069002 A1 | 6/2002 | Morehouse | |
| 2002/0085043 A1 * | 7/2002 | Ribak | 345/810 |
| 2003/0078709 A1 | 4/2003 | Yester et al. | |
| 2004/0010358 A1 | 1/2004 | Oesterling et al. | |
| 2004/0093155 A1 * | 5/2004 | Simonds et al. | 701/200 |
| 2005/0261815 A1 | 11/2005 | Cowelchuk et al. | |
| 2006/0114101 A1 * | 6/2006 | Schambeck et al. | 340/5.61 |
| 2007/0073799 A1 * | 3/2007 | Adjali et al. | 709/200 |
| 2007/0210896 A1 * | 9/2007 | Schambeck et al. | 340/5.72 |
| 2008/0155429 A1 | 6/2008 | Frank et al. | |
| 2008/0228358 A1 | 9/2008 | Wang et al. | |
| 2010/0097239 A1 * | 4/2010 | Campbell et al. | 340/825.25 |
| 2010/0313118 A1 * | 12/2010 | Acquaviva | 715/254 |
| 2011/0066940 A1 * | 3/2011 | Asghari Kamrani et al. | 715/716 |

FOREIGN PATENT DOCUMENTS

WO    WO 2004/074047 A1    9/2004

\* cited by examiner

*Primary Examiner* — Marthe Marc-Coleman

(74) *Attorney, Agent, or Firm* — Fraser Clemens Martin & Miller LLC; J. Douglas Miller

(57) ABSTRACT

An interface system including a vehicle system having an operational data representing a setting of the associated vehicle system and an interface module in communication with the vehicle system to directly modify the operational data of the vehicle system based upon a personalized data, wherein the personalized data is in a platform independent format.

17 Claims, 2 Drawing Sheets

PORTABLE AND PERSONAL VEHICLE PRESETS

FIELD OF THE INVENTION

The present invention relates generally to a personal setting and preference for a vehicle system. More particularly, the invention is directed to an interface system and a method for storing and transferring a personal setting data from one vehicle to another vehicle.

BACKGROUND OF THE INVENTION

Consumers may drive many different vehicles (multiple personal vehicles, rental cars, a vehicle of a friend, a vehicle of a family member, etc). Each time a consumer changes vehicles, the consumer typically needs to configure the vehicle for personal preferences. These preferences include climate comfort settings, audio system settings, audio channel settings, seat settings, mirror settings, etc. Configuring these settings takes time and can be difficult to figure out as the consumer changes between different makes and models of vehicles. Each vehicle will have a unique method for controlling and inputting driver settings. A lack of standardization between manufactures makes configuration of settings more difficult.

One solution includes use of a key or key fob with personal settings stored thereon. A vehicle is typically supplied with 2 keys. Each key may be programmed with different personal settings. The personal settings are typically limited to a seat and a mirror position setting for a single vehicle, and cannot be used for different vehicle manufactures and lines. Certain vehicle manufacturers rely upon radio frequency (RF) communication between the key and the vehicle to transfer a code. The vehicle stores 2 or 3 different personal seat/mirror settings. Each key has a unique identifier. The vehicle recognizes which key is unlocking the vehicle and adjusts the available presets accordingly.

Another solution uses complex algorithms to convert and transfer a personalization data from a first vehicle network to a second vehicle network. For example, U.S. Pat. No. 7,283,902, to Heider et al., proposes a method which retrieves a personalization data in a first vehicle and converts the data from a vehicle-dependent data format used internally in the first vehicle into a portable export data having a protected vehicle-independent format. The method then provides for conversion of the protected export data into a vehicle-dependent, internal format of a second vehicle to make it available to the second vehicle. The method described in the '902 patent requires an export algorithm to translate the internal data of the first vehicle into the export data having a plurality of dynamic personalization rules. The method of the '902 patent further requires an import algorithm to analyze the dynamic personalization rules and translate the export data into an internal data usable by the second vehicle.

It would be desirable to develop an interface system and a method for transferring a personalization data, wherein the system and method provide a standardized means to transfer the personalized data between various vehicle lines and vehicle manufacturers without a two-fold conversion process.

SUMMARY OF THE INVENTION

Concordant and consistent with the present invention, an interface system and a method for transferring a personalization data, wherein the system and method provide a standardized means to transfer the personalized data between various vehicle lines and vehicle manufacturers without a two-fold conversion process, has surprisingly been discovered.

In one embodiment, an interface system for a vehicle comprises: a vehicle system having an operational data representing a setting of the associated vehicle system; and an interface module in data communication with the vehicle system to directly modify the operational data of the vehicle system based upon a personalized data, wherein the personalized data is in a platform independent format.

In another embodiment, an interface system comprises: a vehicle system for a first vehicle, the vehicle system having an operational data representing a setting of the associated vehicle system; an interface module in data communication with the vehicle system to directly modify the operational data of the vehicle system based upon a personalized data, wherein the personalized data is in a platform independent format; and a user device in data communication with the interface module, wherein the personalized data is extracted from the interface module and stored on the user device to be transferred and imported to a second vehicle.

The invention also provides methods for personalizing a vehicle system.

One method comprises the steps of: receiving an operational data representing a setting of a vehicle system; modifying the setting of the vehicle system and thereby the operational data thereof; extracting the operational data from the vehicle system; storing the operational data as a personalized data; and transmitting the personalized data directly into a second vehicle, wherein an operational data representing a setting of a vehicle system of the second vehicle is modified based upon the personalized data.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
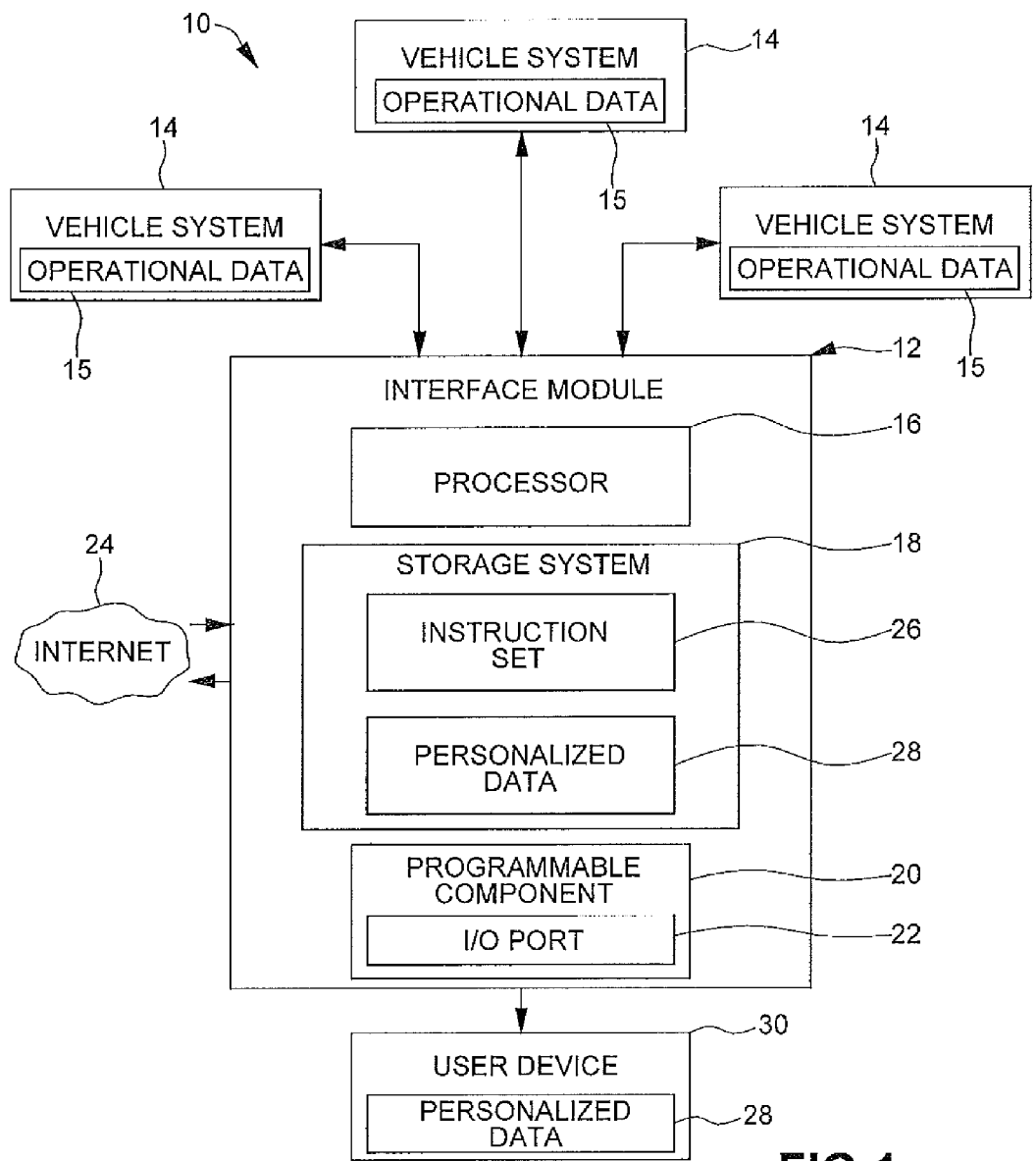
FIG. 1 is a schematic block diagram of an interface system according to an embodiment of the present invention.

FIG. 1 illustrates an interface system 10 according to an embodiment of the present invention. The interface system 10 includes an interface module 12 in data intercommunication with a plurality of vehicle systems 14. Each of the vehicle systems 14 includes an operational data 15 representing a setting of the associated vehicle system 14. It is understood that each of the vehicle systems 14 may be any system or controller such as a climate comfort system, an audio system, a seat controller, a mirror controller, a vehicle lighting system, and a navigation system, for example.

As shown, the interface module 12 includes a processor 16, a storage system 18, a programmable component 20, and an input/output (I/O) port 22. The interface module 12 may include additional components such as communication ports for sending and receiving data via a plurality of hard-wire and wireless protocols, for example. In certain embodiments, the interface module 12 has the ability to connect to the Internet 24. As a non-limiting example, the interface module 12 is an infotainment module such as the modules manufactured by GENIVI Alliance. As a further example, the interface module 12 is a head unit with an open source operating system such as Moblin, for example.

The processor 16 is adapted to analyze data based upon an instruction set 26. The instruction set 26, which may be embodied within any computer readable medium, includes processor executable instructions for configuring the processor 16 to perform a variety of tasks. In certain embodiments, the instruction set 26 configures the processor 16 to analyze and route a data to the appropriate destination such as one of the vehicle systems 14, for example. As a non-limiting example, the analysis of the data includes a normalization of a personalized data 28 representing a personal setting associated with one of the vehicle systems 14.

The storage system 18 may be a single storage device or may be multiple storage devices. Portions of the storage system 18 may also be located on the processor 16. Furthermore, the storage system 18 may be a solid state storage system, a magnetic storage system, an optical storage system, or any other suitable storage system. It is understood that the storage system 18 is adapted to store the instruction set 26. Other data may be stored in the storage system 18 such as the personalized data 28 representing a personal setting associated with at least one of the vehicle systems 14.

The programmable component 20 is in data communication with the processor 16. It is understood that the programmable component 20 may be in data communication with any other component such as the instruction set 24 and the storage system 18, for example. In certain embodiments, the programmable component 20 is adapted to manage and control processing functions of the processor 16. Specifically, the programmable component 20 is adapted to control the analysis of the data received by the interface module 12. It is understood that the programmable component 20 may be adapted to store data on the storage system 18 and retrieve data from the storage system 18. It is understood that the configuration and functions of the processor 16 may be adjusted in real-time or pre-programmed by the original equipment manufacturer (OEM) or user. It is further understood that the functions of the processor 16 may have stored settings that may be recalled and processed, as desired.

The I/O port 22 provides data intercommunication between the interface module 12 and a user device 30. As a non-limiting example, the I/O port 22 is a human machine interface having a hard-wire or wireless protocol for communication with the user device 30. As a further example, the I/O port 22 is one of a universal serial bus (USB), a Wi-Fi® communication, a near field communication, and a Bluetooth® communication. In certain embodiments, the user device 30 is a portable electronic device quipped with a communication port for interconnecting with the I/O port 22. It is further understood that any electronic device capable of storing the personalized data 28 can be used.

Figure 2:
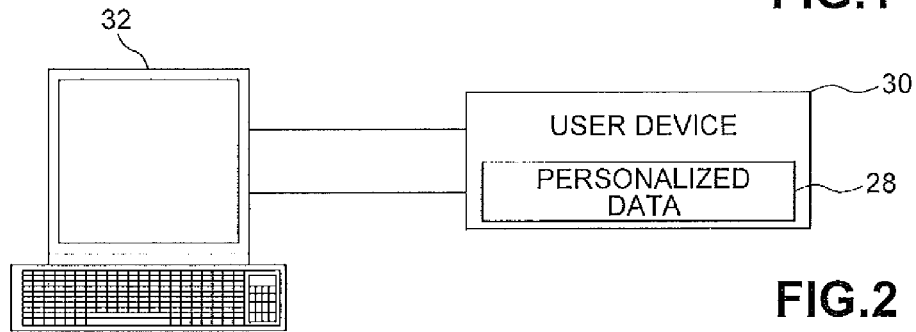
FIG. 2 is a schematic representation of a user device in communication with a personal computer according to an embodiment of the present invention.

As shown in FIG. 2, the user device 30 is connected to a remote computer 32 to create, modify, and manage the personalized data 28. It is understood that the personalized data 28 may be modified remotely via the Internet 24. For example, the computer 32 establishes a data communication with the interface module 12 via the Internet 24 to create, modify, and manage the personalized data 28 stored in the storage system 18 of the interface module 12.

Figure 3:
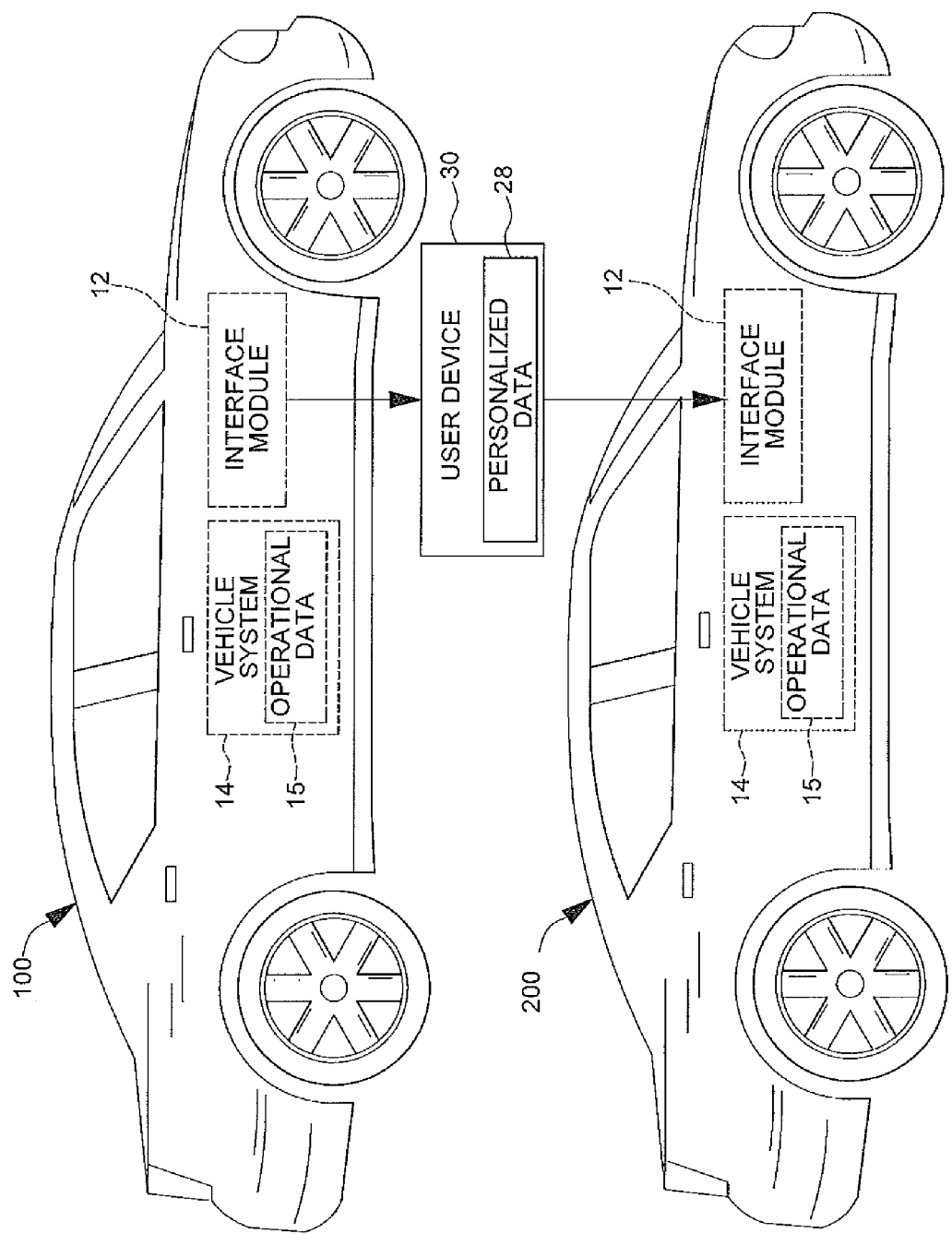
FIG. 3 is a schematic representation of a method for storing and transferring a personal setting data from a first vehicle to a second vehicle according to an embodiment of the present invention.

As more clearly shown in FIG. 3, a plurality of vehicles 100, 200 are equipped with one of the interface modules 12. In a first vehicle 100, a consumer adjusts the settings of at least one of the vehicle systems 14 and thereby the operational data 15 thereof. As a non-limiting example, the setting of the vehicle system 14 may be adjusted according to a personal preference such as an audio setting (e.g. base, fade), a radio station, an entertainment playlist, a seat position, and a mirror position. The "adjusted" operational data 15 of the vehicle systems 14 is extracted by the processor 16 and saved in the storage system 18 as the personalized data 28. It is understood that the personalized data 28 may be saved on any memory-enabled device. It is further understood that the personalized data 28 may be created or modified by a user from a location that is remote to the first vehicle 100. For example, a user may connect to the interface module via the Internet 24 to remotely adjust the personalized data 28 saved on the storage system 18.

In certain embodiments, the personalized data 28 is a discrete value such as the tuning frequency for a preferred radio station. In other embodiments the personalized data 28 is a representative value such as 50% of a maximum adjustable value for a particular setting of one of the vehicle systems 14. Since a maximum adjustable value for vehicle systems is normally within a standardized range of values for all manufactures of vehicles, the representation values can be used to approximate a setting of certain ones of the vehicle systems 14 across various vehicle lines and manufacturers such as a seat position and a mirror position, for example.

The user device 30 is then connected to the interface module 12 through the I/O port 22. Once the user device 30 is in data communication with the interface module 12, the personalized data 28 is transmitted to the user device 30. It is understood that the processor 16 can route the personalized data 28 from the storage system 18 or directly from one of the vehicle systems 14. It is further understood that the personalized setting 28 can be stored in any data format such as a simple data format or a platform independent format, for example.

Since the personalized data 28 is stored on the user device 30, when the user switches vehicles and connects the user device 30 to the interface module 12 of a second vehicle 200, the interface module 12 of the second vehicle 200 automatically adapts the settings of the associated vehicle systems 14 of the second vehicle 200 based on the personalized data 28. In particular, the processor 16 of the interface module 12 in the second vehicle 200 extracts the personalized data 28 from the user device 30 and routes the settings to the appropriate one of the vehicle systems 14 in the second vehicle 200. Where the personalized data 28 is a discrete value, the operational data 15 representing a setting of the associated vehicle system 14 in the second vehicle 200 is changed to match the discrete value. Where the personalized data 28 is a representation value, the operation data 15 of the associated vehicle system 14 in the second vehicle 200 is adjusted based upon a function of the allowed values for the associated vehicle system 14 in the second vehicle 200.

The interface system 10 and methods of the present invention provide a standardized means to transfer the personalized data 28 between various vehicle lines and vehicle manufacturers. The personalized data 28 can be stored on any memory-enabled device and easily transferred from one vehicle to another vehicle without a two-fold conversion process required by conventional systems using different vehicle networks and protocols.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An interface system for a vehicle comprising:
   a vehicle system having an operational data representing a setting of the associated vehicle system; and
   an interface module in data communication with the vehicle system to directly modify the operational data of the vehicle system based upon a personalized data, wherein the personalized data is in a platform independent format for transfer to another vehicle, and stored on a storage system integrated with the vehicle and in data communication with the interface module, and wherein the interface module is configured for data communication with a location that is remote to the vehicle to permit a user at the location to at least one of directly create and modify the personalized data stored on the storage system.

2. The interface system according to claim 1, wherein the interface module is an infotainment module.

3. The interface system according to claim 1, wherein the interface module includes an open source operating system.

4. The interface system according to claim 1, wherein the personalized data is a representative value which approximates the setting of the vehicle system.

5. The interface system according to claim 1, wherein the personalized data is stored on a user device and extracted by the interface module to modify the operational data of the vehicle system.

6. An interface system comprising:
   a first vehicle system for a first vehicle, the first vehicle system having an operational data representing a setting of the first vehicle system;
   an interface module in data communication with the first vehicle system to directly modify the operational data of the first vehicle system based upon a personalized data, wherein the personalized data is in a platform independent format for transfer to a second vehicle, and stored on a storage system integrated with the first vehicle and in data communication with the interface module, and wherein the interface module is configured for data communication with a location that is remote to the first vehicle to permit a user at the location to at least one of directly create and modify the personalized data stored on the storage system; and
   a user device in data communication with the interface module, wherein the personalized data is extracted from the interface module and stored on the user device to be transferred and imported to the second vehicle, the second vehicle including a second vehicle system having an operational data representing a setting of the second vehicle system, wherein the setting of the second vehicle system is modified based upon the personalized data to be substantially similar to the setting of the first vehicle system.

7. The interface system according to claim 6, wherein the interface module is an infotainment module.

8. The interface system according to claim 6, wherein the interface module includes an open source operating system.

9. The interface system according to claim 6, wherein the personalized data is a representative value which approximates the setting of the first vehicle system.

10. The interface system according to claim 6, wherein the personalized data is modified from a location that is remote to the second vehicle.

11. A method for personalizing a vehicle system, the method comprising the steps of:
   a) receiving an operational data representing a setting of a first vehicle system for a first vehicle;
   b) modifying the setting of the first vehicle system and thereby the operational data thereof;
   c) extracting, using a processor, the operational data from the first vehicle system of the first vehicle;
   d) storing the operational data as a personalized data on a storage system integrated with the first vehicle and in data communication with an interface module of the first vehicle in a platform independent format for transfer to a second vehicle, wherein the interface module of the first vehicle is configured for data communication with a location that is remote to the first vehicle to permit a user at the location to at least one of directly create and modify the personalized data stored on the storage system; and
   e) transmitting the personalized data directly into the second vehicle, wherein an operational data representing a setting of a second vehicle system of the second vehicle is modified based upon the personalized data.

12. The method according to claim 11, wherein at least one of steps of b), c) and d) is performed by the interface module.

13. The method according to claim 11, wherein the interface module is an infotainment module.

14. The method according to claim 11, wherein the personalized data is a representative value which approximates the setting of the first vehicle system.

15. The method according to claim 11, wherein the personalized data is stored on a user device.

16. The method according to claim 11, wherein the personalized data is modified from a location that is remote to the second vehicle.

17. The method according to claim 11, wherein the setting of the second vehicle system of the second vehicle is modified to be substantially similar to the setting of the first vehicle system of the first vehicle.

* * * * *